Sept. 1, 1953  T. J. ZELLER ET AL  2,650,373
FOLDING STRETCHER
Filed June 21, 1951  2 Sheets-Sheet 1
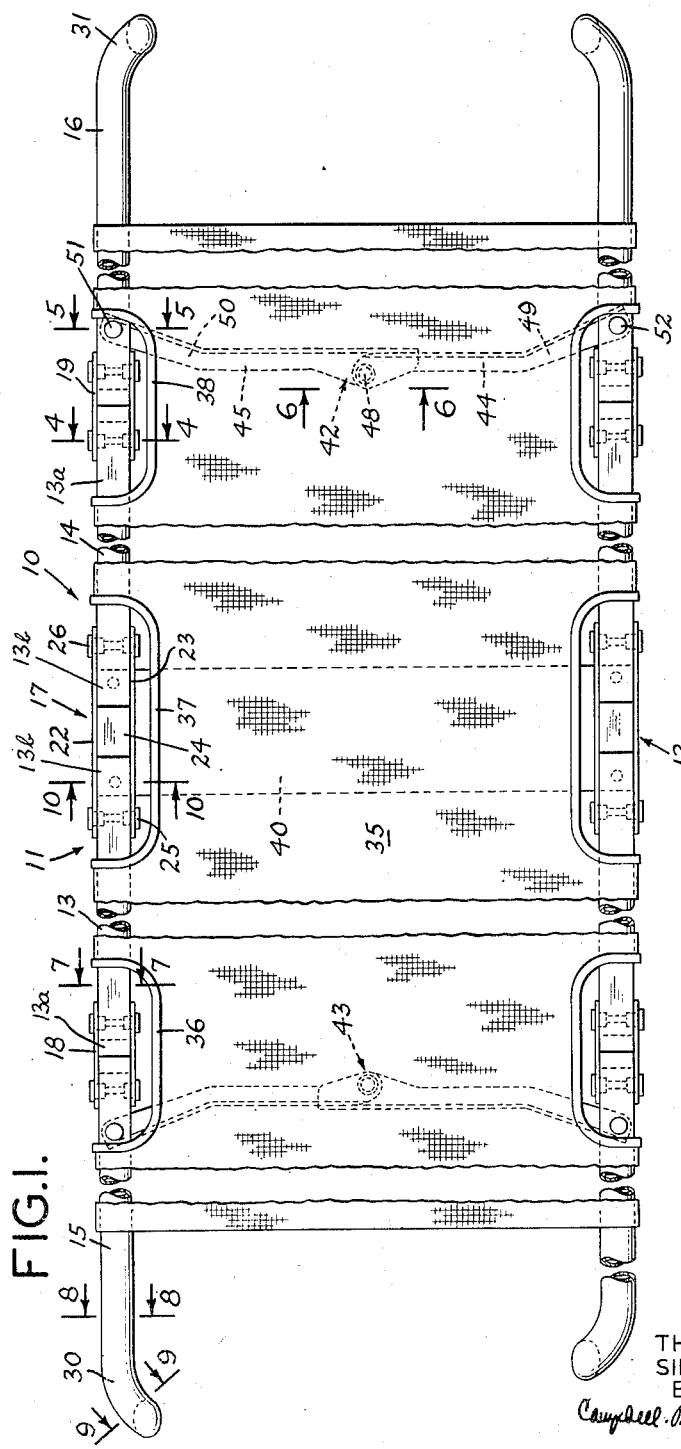
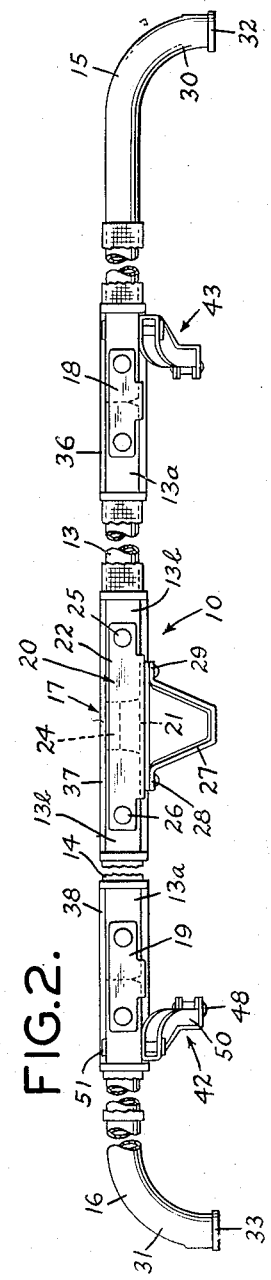
INVENTORS.
THEODORE J. ZELLER
SIDNEY H. BINGHAM
BY
THEIR ATTORNEYS.

Sept. 1, 1953 T. J. ZELLER ET AL 2,650,373
FOLDING STRETCHER
Filed June 21, 1951 2 Sheets-Sheet 2
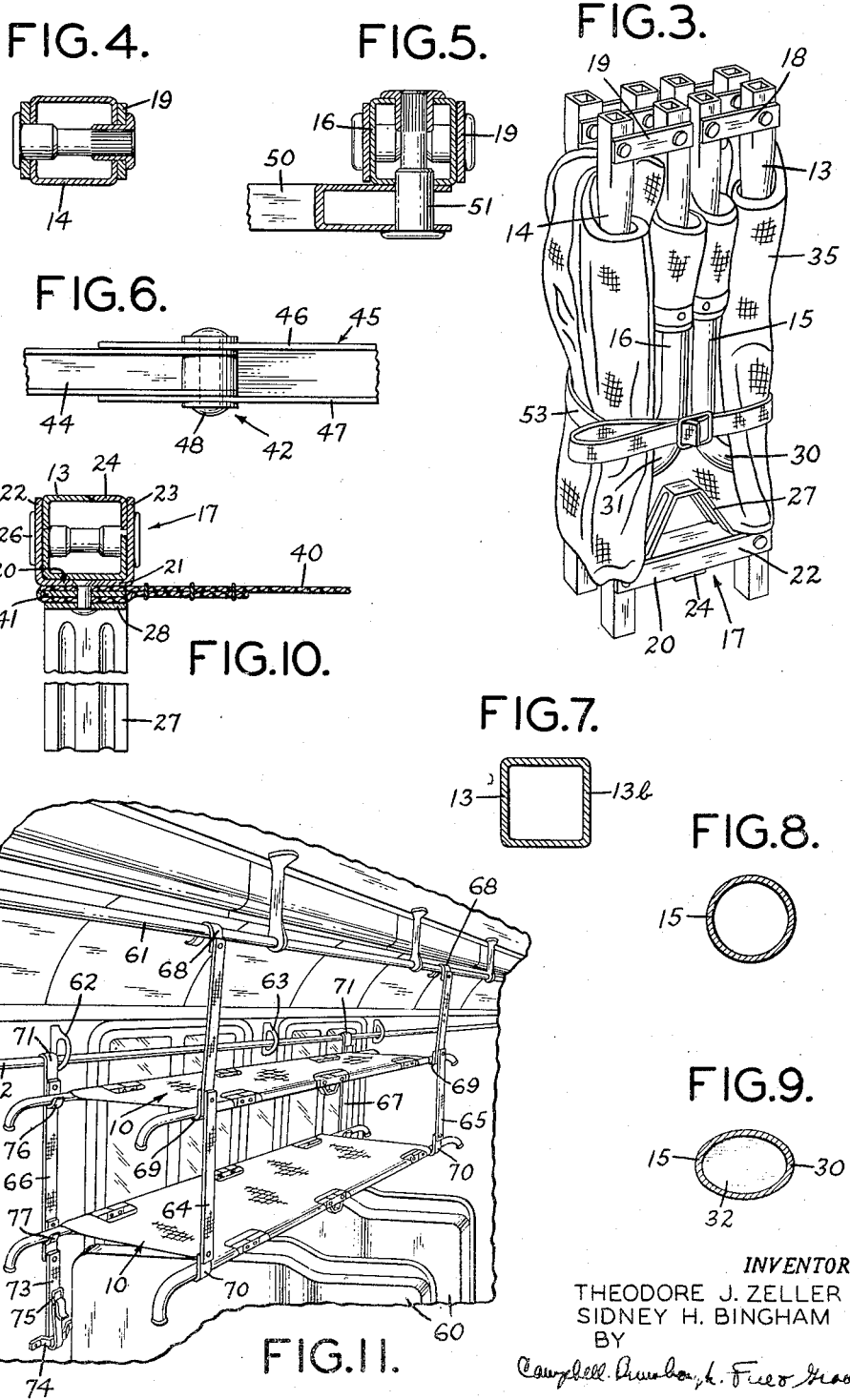
INVENTORS.
THEODORE J. ZELLER
SIDNEY H. BINGHAM
BY
THEIR ATTORNEYS.

Patented Sept. 1, 1953

2,650,373

UNITED STATES PATENT OFFICE 2,650,373

FOLDING STRETCHER

Theodore J. Zeller, Allentown, Pa., and Sidney H. Bingham, New York, N. Y.

Application June 21, 1951, Serial No. 232,788

1 Claim. (Cl. 5—82)

This invention relates to folding stretchers or litters and it relates particularly to folding stretchers or litters which may be stored in buses and other vehicles for converting such vehicles into ambulances during emergencies, and to suspensions for use in such vehicles whereby the stretchers or litters may be arranged in tiers in the vehicles to accommodate a relatively large number of injured people.

In times of emergency, as for example, during air raids, train wrecks and the like, a sufficient number of ambulances and the like is seldom available to handle the casualties. In the large metropolitan areas, the number of vehicles which may be converted into emergency ambulances is very limited because they are not provided with facilities for receiving cots, stretchers and the like.

The present invention relates to an improved form of light weight litter or stretcher, hereinafter referred to as a litter, which can be folded up into a very compact package enabling a number of them to be stowed beneath seats and in other places in the vehicle so that they are readily available in case of emergency. Moreover, suspension means occupying only a very small space may be stowed with the litters so that they may be hung up in tiers in buses and other similar vehicles to accommodate relatively large numbers of casualties.

The litters embodying the present invention are made up of a pair of sectional side rails connected by a strong canvas webbing, the sections of the side rails being hingedly connected so that they can be folded parallel with each other to reduce the over-all length of the stretcher to about a fourth of its extended length. Moreover, the side rails are connected by hinged spreader bars which can be collapsed so that the side rails can be brought together thereby further reducing the over-all size of the litter when in a folded condition.

To further conserve space and simplify the structure, the ends of the side rails are curved downwardly so that they form supporting legs as well as pistol grip handles which greatly facilitate the handling of the litter and its occupant and do away with separate legs for the litter.

The sections of the side rails are connected by sturdy, channel-like hinge members which hold the sections of the side rails in rigid alignment, when extended, but allow the sections to be folded together easily in order to stow the litter.

Litters of the type described can be suspended within the bus or other vehicle by means of straps which may be hung from the regular passenger hand rail in the top of the bus and temporarily installed rails along the side of the bus so that one or more rows of stretchers can be hung along each side of the bus above the seats to receive the casualties.

For a better understanding of the present invention, reference may be had to the accompanying drawing in which:

Fig. 1 is a plan view of a stretcher embodying the present invention shown in fully extended position;

Fig. 2 is a view in side elevation of the extended stretcher;

Fig. 3 is a perspective view of the stretcher in folded condition;

Fig. 4 is a view in section taken on line 4—4 of Fig. 1;

Fig. 5 is a view in section taken on line 5—5 of Fig. 1;

Fig. 6 is a view in elevation and partly broken away of a detail of the stretcher;

Figs. 7, 8 and 9 are views in section taken on lines 7—7, 8—8 and 9—9 of Fig. 1;

Fig. 10 is a view in section taken on line 10—10 of Fig. 1; and

Fig. 11 is a perspective view illustrating the suspension for stretchers in a bus or other vehicle.

Referring now to Figs. 1 and 2, a typical litter 10 embodying the present invention may consist of a pair of side rails 11 and 12, each of which is made up of a pair of middle sections 13 and 14 and a pair of end sections 15 and 16 preferably formed of tubular light weight material such as aluminum or magnesium alloy or, if desired, thin wall steel tubing. The several sections 13 to 16 are, throughout the major portion of their lengths, of circular cross section as shown in Fig. 8. The ends 13a and 13b of the tubular section 13 are expanded to a generally square cross section as shown in Fig. 7. The opposite ends of the sections 14 and the inner ends of the sections 15 and 16 are also of square cross section.

The two middle sections 13 and 14 have their inner ends connected by means of the hinge member 17. The outer ends of the middle sections 13 and 14 are connected by the hinge members 18 and 19 to the inner ends of the end sections 15 and 16, respectively.

The hinge member 17, as best shown in Figs. 1, 2 and 10 includes a channel member 20 including a base web 21 and two parallel side flanges 22 and 23. The side flanges 22 and 23 are longer than the base flange 21 as best shown in Figs. 1 and 2 so that they extend outwardly beyond the opposite ends of the base flange.

The channel member 20 may be reinforced by means of an inverted channel member 24 welded between the side flanges 22 and 23 at about their mid-portions.

The squared ends of the metal sections 13 and 14 of the side rail are received between the side flanges 22 and 23 and are pivotally connected thereto by means of the rivets or their equivalent 25 and 26 so that the rail sections 13 and 14 can move pivotally with respect to the channel member 20 between a position in which they are aligned (Figs. 1 and 2) and another position in which they are in spaced parallel relation (Fig. 3). The inner ends of the rail sections 13 and 14 overlie the base flange 21 so that the side rails 13 and 14 engage the base flange when they are in alignment as shown in Fig. 2 and cannot collapse when subjected to downward pressure.

The end sections 15 and 16 are connected respectively to the outer ends of the metal sections 13 and 14 by means of similar channel-shaped hinges 18 and 19. The hinges 18 and 19 are, however, shorter than the hinge 17 for a purpose to be described.

The base flange 21 of the hinge 17 may also be provided with a supporting leg 27 formed of a V-shaped strip of corrugated metal having outwardly extending flanges 28 and 29 which are secured to the base flange 21 and other structure hereinafter described by means of rivets or the like.

As best shown in Fig. 2, the outer ends of the end sections 15 and 16 are curved downwardly so that they extend substantially at a right angle to the axis of the sections 15 and 16. These downwardly curved end portions 30 and 31 form supporting legs for the opposite ends of the litter as well as handles for carrying the litter. The end portions 30 and 31 may be provided with end closure caps 32 and 33 to prevent the entry of dirt. The curved ends 30 and 31 also converge inwardly as pointed out in Fig. 1 so that their axes are offset inwardly from the inner edge of the tubular sections 13 and 14. The ends 30 and 31 also are flattened to an oval cross-section as shown in Fig. 9. The offset and flattened shape of the curved leg and handle portions enable them to be disposed between the rails 11 and 12 when they are folded.

The two side rails 12 and 13 are connected by a web or sheet of fabric 35 in the usual way, there being reinforced notches 36, 37, 38 and so forth in the sheet extending around or straddling the hinges 17, 18, and 19 in each side rail.

To further reinforce the center section of the stretcher where the stresses are concentrated, a wide band of webbing 40 is connected between the hinge members 17 in the opposite side rails as shown in Figs. 1 and 10. The webbing band 40 is looped around a reinforcing plate 41 which is interposed between the flanges 28 and 29 of the leg 27 and the base flange 21 of the channel member 20. The overlapping ends of the web 40 are stitched or riveted together and the whole assembly is secured by the same rivets which secure the leg 27 to the bottom of the hinged channel 20.

The side rails 11 and 12 may be held in expanded or spread condition by means of the hinged spreader bars 42 and 43 of similar construction adjacent the hinges 18 and 19. As shown in Figs. 1, 2, 5 and 6, the spreader bar 42 is made up of two channel-shaped arms 44 and 45. The arm 45 has a spacing between its side flanges 46 and 47 greater than the height of the member 44 so that the member 44 is received between the side flanges 46 and 47 of the arm 45. The two arms 44 and 45 are connected by means of a pivot or rivet member 48 passing through the arm 44 near its inner end and through the arm 45 at a point spaced from its inner end so that the inner end of the arm 45 overlaps a portion of the arm 44 outwardly of the pivot 48. As shown in Fig. 1, the axis of the pivot 48 is eccentric to the axis of the arms 44 and 45 and these arms further have angularly inclined outer ends 49 and 50 which are connected by means of the rivets or bolts 51 and 52 to the arms 16, 16 of the rails 11 and 12. Inasmuch as the pivot connections between the inner ends and the outer ends of the arms 44 and 45 are offset, a locking toggle is provided when the arms are straightened thereby preventing collapse of the spreader bars when subjected to a load. Nevertheless, if pressure is applied against the spreader bar 42 forcing it toward the outer end of the litter, the spreader bar will collapse and will allow the side rails to be brought close together.

The litter may be folded, as follows: The spreader bars 42 and 43 are collapsed to bring the side rails 11 and 12 close together. The end portions of the rails 16 and 15 are folded under and parallel with the middle sections 13 and 14 and the middle sections 13 and 14 are also folded under into parallel relation as disclosed in Fig. 3 with the legs 27 directed upwardly between the folded sections 13 and 14 and with the curved handles and legs 30 and 31 disposed inwardly of the middle sections 13 and 14 of the rails 11 and 12.

As shown in Fig. 3, the long hinge member 17 provides sufficient space between the side rails 13 and 14, when they are folded, to receive the end sections 15 and 16 and the fabric web 35 between them. The folded structure can be secured by means of a strap 53 for convenient storage.

When the litters are required, they can be suspended in buses, street-cars, subway trains and the like by means of the suspension disclosed in Fig. 11 to convert such vehicles into emergency ambulances. These vehicles have rows of seats permanently installed in them so that a satisfactory emergency litter suspension should be of a type that supports the litter or litters above the seats. The suspension is illustrated in Fig. 11 as installed in a bus having the usual seats 60, a passenger hand rail 61 for standees and hand grips 62, 63, etc. for the convenience of the passengers in the outside seat.

The suspension may consist of four straps 64, 65, 66 and 67. The inside straps 64 and 65 are essentially alike and each may consist of a strip of webbing having a downwardly facing hook 68 at its upper end to engage over the hand rail 61. The hook may be made of strap metal or the like. Along the length of the strap 64 and 65 are upwardly facing hooks 69 and 70 in spaced apart relation to engage the opposite ends of one of the side rails 11 or 12 of the litter 10 so that one or more litters may be suspended in vertically spaced relation above the seats 60.

The outer straps 66 and 67 are similar to the straps 64 and 65 except that the hooks 71 on their upper ends engage a temporarily installed bar 72 passing through the hand grips 62, 63, etc. The lower ends of the straps 66 and 67 are provided with extensions 73 to be passed through brackets 74 fixed to the wall of the bus and secured by means of the buckles 75 on the straps to hold them taut. The hooks 76 and 77 on the straps 66 and 67 should be in alignment with the hooks 69 and 70 on the straps 64 and 65 so that the litters are held parallel with the floor of the bus.

When the straps 66 and 67 are held taut, the litters cannot sway appreciably as the bus moves.

The suspension described above is easily and quickly installed in a bus or other vehicle so that it can be converted easily into an emergency ambulance. The straps can be packed in a relatively small box or compartment in the bus or other vehicle so that it is available at all times.

From the preceding description it will be apparent that litters and suspensions therefor have been provided which are strong, light in weight and compact, when folded, and that they are constructed and arranged so that they are convenient to fold and unfold. Through their use, many different kinds of vehicles can be converted quickly into emergency ambulances. The arrangement of the legs and handles on the litters facilitate their handling under all conditions and the handle shape is especially useful for carrying the litters up and down stairs, hills and other inclines because there is no danger of loss of grip on the curved handles.

It will be understood that the litters and the suspensions therefore are susceptible to some modification in accordance with the vehicle in which they are used. Therefore, the form of the litters and suspension described herein should be considered as illustrative.

We claim:

A folding litter for installation in buses and other vehicles comprising a pair of side rails, each rail having a pair of middle sections and a pair of end sections at opposite ends of said middle sections, hinges connecting the inner ends of said middle sections to each other and the outer end of each middle section to the inner end of one of said end sections; each of the hinges connecting the adjacent ends of said middle sections including an upwardly opening channel member having substantially parallel side flanges and a bottom web shorter than said side flanges and terminating inwardly of the ends of said side flanges, and pivot means extending through said side flanges and said adjacent ends of said middle rail sections; said hinges restraining said sections to movement between an open position in alignment with each other and a folded position substantially parallel with each other, each end section having a curved outer end forming a supporting leg and handle, other supporting legs mounted on the hinges connecting the inner ends of said middle section and extending in the same direction as said curved outer ends; each of said other legs including a V-shaped member fixed to the bottom web of the hinges connecting the inner ends of said middle sections and extending to about the plane of the ends of said supporting legs and handles when said sections are in said open position; a fabric supporting member connecting said side rails, and hinged spreading bars interposed between said side rails to releasably hold them in spaced apart relation.

THEODORE J. ZELLER.
SIDNEY H. BINGHAM.

References Cited in the file of this patent

UNITED STATES PATENTS

| Number | Name | Date |
|---|---|---|
| 2,378,809 | Thomson et al. | June 19, 1945 |
| 2,391,051 | Windsor | Dec. 18, 1945 |
| 2,396,931 | Schmid | Mar. 19, 1946 |
| 2,473,364 | Dickinson et al. | June 14, 1949 |
| 2,545,813 | Jackson | Mar. 20, 1951 |

FOREIGN PATENTS

| Number | Country | Date |
|---|---|---|
| 406,208 | Great Britain | Feb. 22, 1934 |